United States Patent [19]

Mejia et al.

[11] Patent Number: 4,663,612
[45] Date of Patent: May 5, 1987

[54] PATTERN-COMPARING SECURITY TAG DETECTION SYSTEM

[75] Inventors: Ezequiel Mejia, Longueuile; Pierre Taillefer, Boucherville; Phuc Nguyen, Montreal, all of Canada

[73] Assignee: Sigma Security Inc., Toronto, Canada

[21] Appl. No.: 648,111

[22] Filed: Sep. 7, 1984

[30] Foreign Application Priority Data

Feb. 16, 1984 [CA] Canada .................................. 447593

[51] Int. Cl.⁴ .............................................. G08B 13/18
[52] U.S. Cl. .................................... 340/572; 340/551
[58] Field of Search ............................. 340/572, 551; 343/6.8 R, 6.8 LC, 6.5 LC, 6.5 R

[56] References Cited

U.S. PATENT DOCUMENTS 4,382,291 5/1983 Nakauchi .............................. 367/93
4,476,459 10/1984 Cooper et al. ................. 343/6.8 LC
4,539,558 9/1985 Fearon ................................ 340/572

Primary Examiner—Glen R. Swann, III
Attorney, Agent, or Firm—Alan H. Levine

[57] ABSTRACT

Security apparatus for detection of a security tag to be hidden in an article to be detected. The digitized waveshape of a tag signature signal preferably obtained by distortion of an oscillating magnetic field, (whereby the distortion signal being detected constitutes a signature signal) is compared with a stored digital representative of a signature signal, and an alarm enable signal is generating in the event of correlation a predetermined number of times in a predetermined time period. The stored signal is modified by the specific factors. The characteristics of the apparatus and of environmental factors. The result is a reliable detection apparatus with a very low false alarm rate.

23 Claims, 10 Drawing Figures

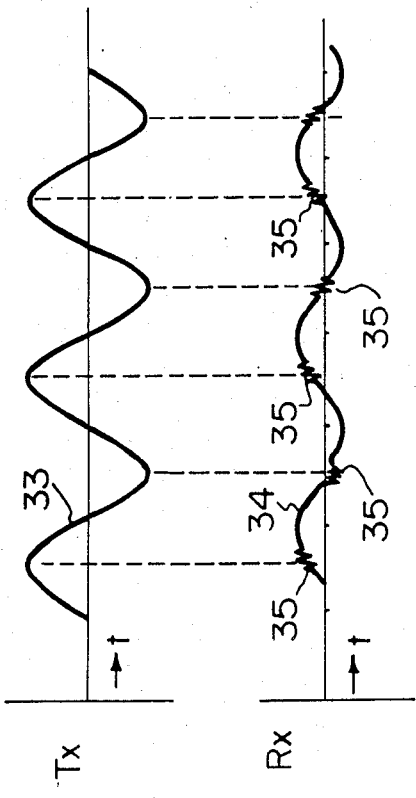

PATTERN-COMPARING SECURITY TAG DETECTION SYSTEM

BACKGROUND OF THE INVENTION

This invention relates to security apparatus, and in particular to theft detection apparatus for detecting the presence of a saturable magnetic tag which is usually hidden in an article which is intended to be protected.

In recent years a class of theft detection apparatus has become popular in which a tag or strip hidden in an article to be protected is detected. While there are variations of the kind of tag to be detected (some being comprised of resonant circuits etc.), there have been a number of designs and improvements on the designs based on the detection of specific harmonics or groups of harmonics of signals which are stated as being generated by the tag. This class of detector is derived from an invention by Pierre Arthur Picard which is described in French Patent No. 763,681, issued Nov. 10, 1933.

In the invention described in that patent, thin strips of material having a high magnetic permeability are repeatedly driven in and out of saturation in the presence of an alternating magnetic field. A receiving antenna receives magnetic fields which are said to be generated by the strip of material, which alternate at frequencies which are harmonics of the original transmission frequency. A receiver connected to the receiving antenna is tuned to detect signals at one or more of the harmonic frequencies produced by the target strip, and an alarm is activated when such detection takes place. The specific frequencies of the harmonics designate the presence of the specific tag material.

Improvements to that system are described U S. Pat. No. 4,123,749 relating to the continuous rotation of the transmitted magnetic field, U.S. Pat. No. 3,983,552 which relates to demagnetization of a control element associated with the strip, and which detects predetermined harmonics, U.S. Pat. No. 3,665,449 which detects signals of predetermined frequencies and having an applied field of predetermined magnitude, U.S. Pat. No. 3,631,442 which relates to generating at least two oscillating electromagnetic fields at different frequencies, U.S. Pat. No. 3,790,745 which performs analysis of the harmonic components of the received frequencies, U.S. Pat. No. 3,754,226 which relates to a form of transmitting antenna, U.S. Pat. No. 3,820,103 which detects a predetermined harmonic signal generated by the tag or marker, U.S. Pat. No. 4,215,342 which utilizes a sub-resonant tag, U.S. Pat. No. 4,158,434 which relates to the direction of the lines of magnetic saturation of the tags or labels, and U.S. Pat. No. 4,298,862 which relates to the use of amorphous ferromagnetic materials which generate magnetic fields having "tones" which are retained after the marker or tag is flexed or bent.

In the aforenoted patented inventions, the markers or tags to be affixed to the goods are specifically utilized to generate signals which are harmonics of the frequency of the magnetic field which is applied to a detection region or zone. Many of the inventions are directed to refinements for maximizing the possibility of detecting certain ones of the harmonics which are said to specifically identify the unique presence of the strip or tag, or to thereby reject erroneous identification of other metallic objects such as belt buckles, jewelry, other metallic articles of various constitution carried by a person, etc.

Nevertheless it has been found that such apparatus still can generate frequent false alarms, often caused by materials of similar magnetic constitution as the real tag to be detected. As was indicated by Picard, the size or shape of the tag merely varies its amplitude; the constitution of the materials identifies the harmonic content of the signal which is generated. Thus the detection of similar material objects as the strip, marker or security tag has been found to be virtually unavoidable.

SUMMARY OF THE INVENTION

The present invention utilizes an entirely new approach to detection of such tags. Rather than detection of harmonics of a signal generated in or by the tag as in the prior art, the tag of the present invention is utilized to distort the magnetic field within the detection area. A receiving antenna detects the distorted field, eliminates the carrier frequency, and presents the distortion signal as a signal to be detected to apparatus which compares the wave shape of the distortion signal to a stored wave shape. Indeed, in the preferred embodiment the received signal is correlated with the stored signal and upon finding a predetermined degree of correlation, an alarm enable signal is generated. Thus harmonic isolation and detection is not needed and is not used.

In addition, it was found that in the prior art inventions, in order to isolate the harmonics of the original magnetic signal, a high degree of filtering was required, to identify only one or a selected few harmonics. During manufacture it is difficult to provide filters which are precisely identical, resulting in different units having different sensitivities, due to variation in component values resulting from tolerance variations. Further, as the units age, and with environmental changes in temperature, the detector characteristics would change over time, requiring expensive alignment procedures to be undertaken toward an increase in false alarm rate or a decrease in sensitivity, and thus of reliability.

In the present invention each unit "learns" the waveshape characteristics which are to be identified, the signals which are learned being different for each specific unit because of the variation in the characteristics of each specific unit. Each unit is set up in its operating location, and there it is put through a simple procedure by which it "learns" the waveshape characteristics of the distortion signal caused by the presence of a tag. Thus not only are the characteristics of each specific detection system compensated for, but variations in the environment of the detection system are at the same time taken into account. In addition, should for some reason the detection system characteristics change (e.g. with aging), it can again be put through the same initial "learning" process to again store the waveshape characteristics of the tags to be detected, this time the stored characteristics being modified by the changed or aged characteristics of the detection system. Thus complex and precision filters need not be precisely aligned to obtain units as identical as possible, and environmental effects are automatically compensated for.

Indeed, it is contemplated that with the concepts and structure described herein, that different tags having characteristics different from each other can be used and identified by the "learned" stored initial signal representations, thus facilitating identification of one or difference classes of tags.

Further, it is contemplated that the form of the signal which is stored need not necessarily be the waveshape of a distortion signal; it can be any form of signature signal from the tag to be detected, e.g. signals from kinds of tags other than the field distortion tag described herein. Thus the signal to be detected will be referred to herein as a tag signature signal, which is not restricted specifically to a waveshape, although that is the preferred form of signal to be identified. An important aspect of the invention, however, is that the signature signal should be compared with a stored representation thereof which is to be detected.

In general, one embodiment of the invention is an apparatus for detecting a security tag in a security tag detection system comprising apparatus for storing a first security tag signature signal, apparatus for receiving a signature signal from a security tag, apparatus for comparing the received signature signal with the stored signature signal, and apparatus for providing an output alarm enabling signal in the event the stored signature signal is similar to the compared received signature signal to a predetermined degree.

Preferably successively received signature signals from the same tag are repetitively compared to the stored security tag signature signal, and the alarm signal is enabled in the event the stored signature signal is similar to the received signature signal to a predetermined degree a predetermined minimum successive number of times, or a predetermined minimum number of times over a predetermined period of time.

In the "learning" phase of the apparatus, an oscillating magnetic field is applied to a detection region. A security tag signature signal is detected from the received magnetic field from the detection region caused by distortion of the field by the tag, and a memory stores a signature signal derived from the received signal. It is preferred that the signature signal should be comprised of at least two peaks and a trough between the peaks. It is further preferred that this initial signature signal should be stored if its peak to trough amplitude ratio is at least a predetermined value and also that the peaks are no greater in amplitude than the first threshold and that the trough is no smaller than a second threshold.

According to a further embodiment, the peaks should be classified in, for example, three amplitude level ranges. Amplitude classifications are assigned to each of the thresholds. The amplitude of the peaks are determined upon the peaks having amplitude below predetermined thresholds, and above predetermined thresholds, i.e. between three amplitude ranges. The peak to trough ratio or ratios are determined in the event the amplitude of the peaks are not in excess of or lower than the predetermined thresholds, and the digital representation of the signature signal is stored in memory locations according to the classifications.

As a result, when the apparatus is used to detect the tag, the peak amplitude of the signature signal is established and the signature signal waveform is compared with the corresponding stored representation which corresponds to the maximum threshold range which the received signature did not exceed. As noted above, it has been found desirable to provide three thresholds by which a low, medium and high amplitude received signature signals are compared with corresponding low, medium and high amplitude stored representative signature signals.

The result of the above invention is the provision of a tag detection system which has been found to have an extremely low false alarm rate, which rate is believed to be significantly lower than the false alarm rate of the systems which detect harmonics and enable an alarm upon detection of those harmonics. It is thus believed that the present invention will find wide commerical acceptance.

It should be noted that the term "alarm enabling signal" is intended to mean a signal which indicates the presence of the tag, and is not intended to be construed only to mean a signal for causing an actual alarm display or sound to turn on.

BRIEF DESCRIPTION OF THE DRAWINGS

A detailed description of the preferred embodiment of the invention is given below, with reference to the accompanying drawings, in which:

FIGS. 7A, 7B and 7C illustrate waveforms found at various points in the invention.

DESCRIPTION OF THE PREFERRED EMBODIMENT

Figure 1:
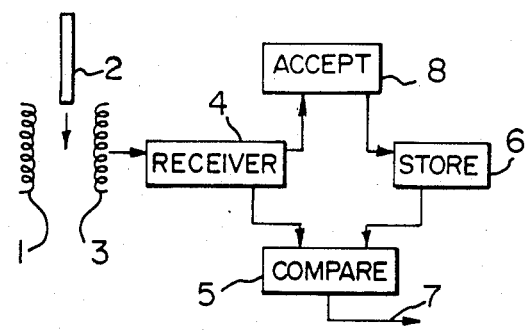
FIG. 1 is a general block diagram used to illustrate the concepts of the invention, FIGS. 2A and 2B; are representative waveforms used to illustrate the operation of the invention.

FIG. 1 illustrates in block form the basic conceptual structure of the preferred embodiment of the invention. A transmitting antenna 1, typically in the form of a large coil, carries an alternating current, usually in a resonant mode and generates an alternating magnetic field in a region through which a tag 2 which is to be detected passes. The apparatus for setting up the magnetic field need not be described here to understand the concepts of the invention and can be as described in the aforenoted French Picard patent. A receiving antenna 3, which can be a large coil in FIG. 8 form, for example, also as described in the Picard patent (or the antennae reciprocally interchanged) detects the magnetic field through which tag 2 passes.

Preferably tag 2 is comprised of a lamination of a pair of thin strips of magnetically soft materials having different coercivities but similar thresholds of magnetic saturation. Short strips of a third magnetizable material having high coercivity relative to the coercivities of the magnetically soft materials are disposed in fixed spaced positions adjacent to and along at least one face of the magnetically soft materials so as to magnetically bias the magnetically soft materials into saturation when the third magnetizably soft material has been remanantly magnetized to avoid detection of the tag. Successful materials that have been used as the soft magnetic materials are amorphous metallic alloys, such as $Co_{66}Fe_4(Mo,Si,B)_{30}$, each strip of the pair having been differently heat treated to obtain different coercivities but similar magnetic saturation thresholds. However different materials could be used, which have the above characteristics and different materials which have different coercivities and different thresholds of magnetic saturation. For the purpose of this description to allow detection, the strips are assumed not to be biased into magnetic saturation by the third magnetizable material. The important characteristic of the unbiased material, however, is that when the tag 2 is placed in the magnetic field caused by transmitting antenna 1, that field is distorted. This occurs when the strength of the field is sufficient to repeatedly bias the magnetically soft materials into, and then out of saturation, in opposite polarity directions, as the alternating magnetic field increases, then reverses.

The distorted magnetic field passing through receiving antenna 3 generates a signal voltage which is applied to receiver 4.

It is contemplated that should a signature signal be generated by the security tag 2 by means other than the application of the magnetic field by coil 1, this would satisfy the concepts of the invention.

According to the preferred embodiment, receiver 4 distinguishes the distortion portion of the signal, processing it as a tag signature signal. This signal is applied to a comparator 5.

A memory (store) 6 contains a stored signal corresponding to the tag signature signal which it is desired to detect. This signal is also applied to comparator 5.

When the comparator 5 distinguishes a correspondence between the form of the received signature signal and the stored signal, it outputs an alarm enabling signal on the output line 7.

In order to store the signal to be recognized initially, the apparatus is put into its initialization mode, which activates an accept function circuit 8. A field is established in a detection zone as before and a tag is introduced therein. The signal is received in receiver 4 and the resulting distortion signal, i.e. the tag signature signal is applied to the accept circuit 8. Here the amplitude of the tag signature signal is determined as to whether it falls between an upper and lower threshold. If it does not, the acceptance operation does not proceed. If it does fall between the thresholds, for the two-material laminated tag, at the time that the strips saturate it has been found that there would be two analog peaks separated by a dip or valley therebetween. The ratio or ratios of the peaks to valley amplitude is determined, and if it is within a predetermined range, the accept circuit applies the tag signature waveform to the store 6 for storage.

It is preferred that the tag signature signal should be digitized before application to the comparison circuit 5 or the accept circuit 8. Storage of the signal should preferably be in digital form in a random access memory, preferably of non-volatile type. It will also become clear that the comparator circuit, the accept circuit and a portion of the receiver could be effected in a central processing unit, and that the store 6 would be an adjunct memory operating therewith.

Figure 2:
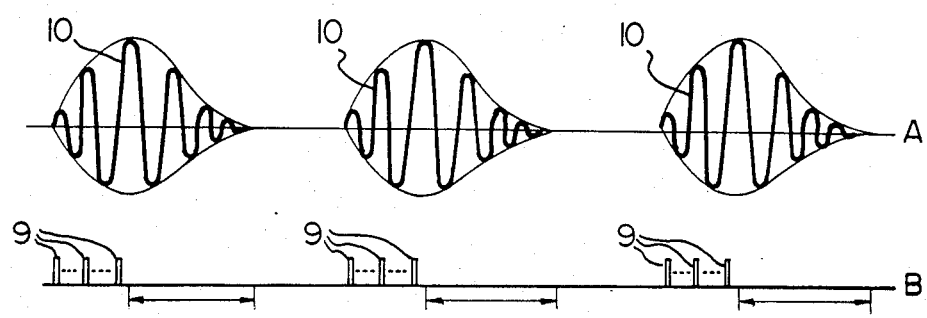
Figure 3:
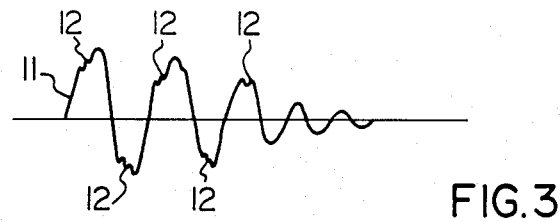
FIG. 3 is an exaggerated waveform of a received signal.
Figure 4:
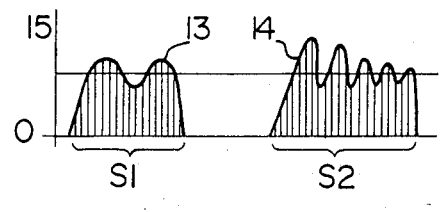
FIG. 4 illustrates an idealized and representative tag signature signal.

Certain of the signals observed are shown in exaggerated form in FIGS. 2, 3 and 4. In FIG. 2B, short duration square waves 9 are shown which are applied to transmitting antenna 1. The pulses 9, which will be referred to herein as pumping pulses, would typically be approximately 12 microseconds long. Approximately 15 pumping pulses are applied to transmitting antenna 1, resulting in an increasing voltage waveform 10 thereacross. With each pumping pulse, the amplitude of waveform 10 increases. Preferably a capacitor is connected in parallel with transmitting antenna 1, to form a resonant circuit at the frequency of the pumping pulses. Typically the peak amplitude obtained would be about 200 volts.

The pumping pulses are then stopped, and the current in transmitting antenna 1 continues to oscillate, but with decreasing voltage amplitude as shown, eventually reaching 0. This cycle is repeated continuously, the oscillating or carrier signal chosen being at a frequency of 6.1 kilohertz, with peaks generated about every 64 milliseconds. If two transmitting coils are used with one receiving coil, the receiving coil will receive a burst of 6.1 kilohertz signal every 32 milliseconds.

It was mentioned earlier that the received signal in receiving antenna 3 will be a distorted representation of the transmitted signal. The distortion is caused by the presence of the tag 2, causing purturbations in the lines of flux of the field in the detection area. When the, or each of the soft magnetic materials saturates, a peak in the received signal results. This is shown by the representative received signal 11 in FIG. 3. It will be seen that at both the positive and negative excursions of the received signal, double peak distortions 12 in the received waveform are found. It may be noted that when the transmitted waveform reduces to such a low amplitude that the tags cannot be saturated, no distortions occur.

Receiver 4 then detects and isolates the distortion portion of the signal, which is the received tag signature signal shown in idealized form as waveform 13 in FIG. 4.

Preferably the signal is applied to a four bit analog-to-digital (A/D) converter, which has sixteen levels shown in FIG. 4 as levels 0–15. The converter samples waveform 13, resulting in digital signals which correspond to the amplitude of the vertical lines over the X axis (time) range S1. The digitized signal is either applied to comparator 5 as described earlier or to the accept circuitry 8, also as described earlier.

However it has been found that the idealized tag signature signal is usually not realized, and is itself distorted with ambient noise, 60 cycle or harmonics thereof, power line signals, transients, etc. This non-idealized, and more normal received tag signature signal is representatively shown as waveform 14.

One of the reasons prior art systems often are plagued with false alarms now will be evident. If the system is desired to react with an idealized received signal of specific harmonic frequencies, assuming that the received circuitry does not age or change component values, and that all component values are precisely as were designed, such prior art systems might operate satisfactorily. However it has been found that the received tag signal is affected by environmental and other factors to a very significant effect. As an example the signature waveform 14 looks vastly different from idealized tag signal 13. Furthermore, different installations of the same detection apparatus at different locations have been found to result in mutually different tag signature signals, and different from the theoretical ideal form to such a degree that it can be understood that false alarms would far from uncommon.

However in the present invention, the form of the actual tag signature signal produced by the combination of the detection system, the tag and the environmental factors is determined on site and is stored in the store 6 of the apparatus. As described earlier, subsequent tag signature signals which match the non-idealized but real tag signature signal will cause an alarm enabling signal to be generated.

Figure 5:
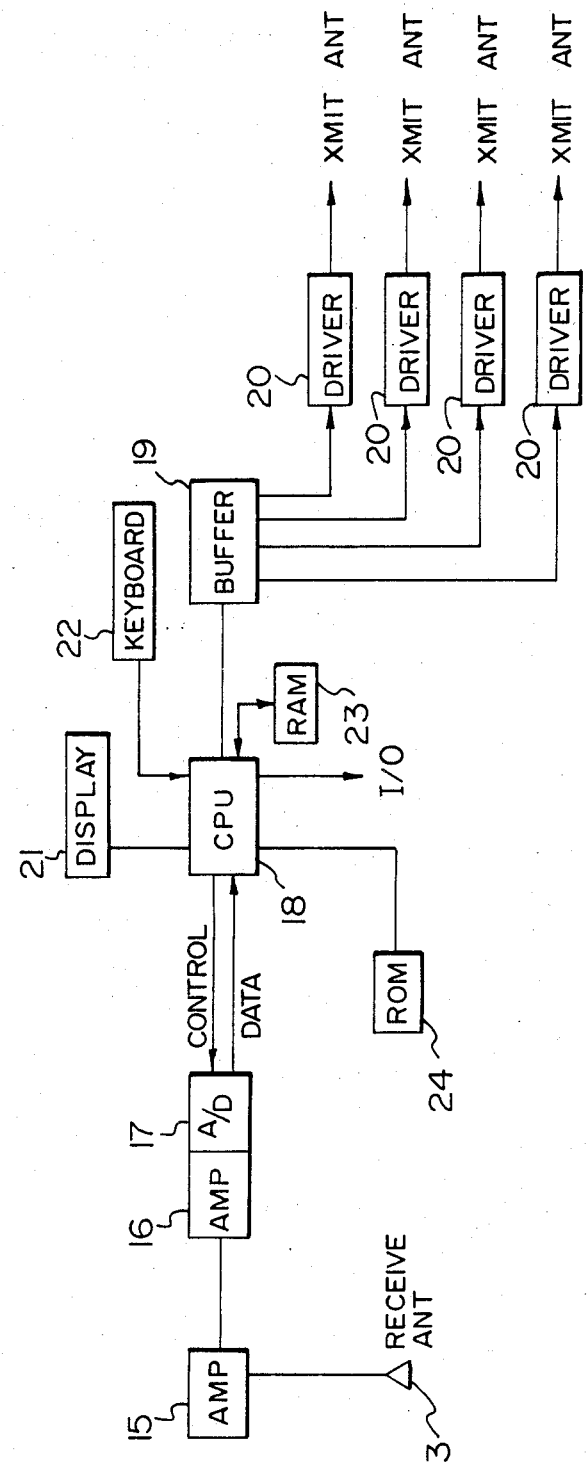
FIG. 5 is a block diagram of the preferred form of the invention.

FIG. 5 illustrates a basic block diagram of the preferred form of the invention. A receiving antenna 3 feeds a receiver comprised of a preamplifier 15, which has its output connected to the input of amplifier 16.

The output of amplifier 16 is connected to the input of analog-to-digital (A/D) converter 17. The data output of A/D converter 17 is connected to the data bus of a central processing unit circuit (CPU) 18. Control lines of CPU 18 are connected to A/D converter 17 for applying timing signals for controlling its operation.

CPU 18 is also connected to a buffer interface 19, which has outputs connected to one or more transmit antenna drivers 20. The output of each driver 20 is connected to a parallel resonant circuit having a transmit antenna as its inductive element.

A display 21 and a keyboard 22 are connected to the CPU in a well-known manner. Other input/output lines I/O are also connected to CPU 18 in a well known manner.

In operation, the CPU applies pulse signals, as described with reference to FIG. 2, waveform B, to drive buffer 19. The driver 20 applies amplified representations thereof to the corresponding transmit antenna coil, which builds up its current and voltage amplitude as described earlier with reference to FIG. 2, waveform A.

For example, four transmit antennae could be used for a double exit to a retail establishment, two transmit antennae being located on opposite sides of the double exit pathway for a customer, and two other transmit antennae being located between the exit pathways and being driven by pulse groups over alternate time periods. Similarly the first two transmit antannae are driven by pulse groups having alternate time periods. This results in magnetic field directions which sequentially change within the two pathway detection zones, while providing minimum interference between the two adjacent exit pathways.

The representative receive antenna 3 receives the magnetic field, which is distorted by the presence of a tag which is not previously biased into saturation by a magnetized hard magnetic material in adjacency thereto. For the four transmitting antennae case there would be two receiving antennae, one for each pathway detection region, but for the sake of simplicity of description to facilitate understanding we will restrict the receive apparatus description to a single channel.

The received signal is amplified in amplifier 15, and the carrier signal is removed in amplifier 16. The resulting distortion signal, i.e. the received tag signature signal such as that shown in waveform 13 (idealized) or 14 (more representative of the real) is digitized in A/D converter 17 and is applied to CPU 18. CPU 18 at the same time receives a digital stored tag signature signal from random access memory RAM 23, compares it with the received signal, and if they match to a predetermined degree, generates an alarm enable signal and applies it to the I/O line.

At the time of the initial installation, the keyboard 22 is used to place the CPU into its initialization mode, with the appropriate indication shown in display 21. Of course other factors such as time of day, etc. can also be displayed.

When the CPU is in its initialization mode, it causes the generation of the magnetic field in the detect area as before, and when a tag is placed in the detection field the resulting tag signature signal appears on the data lines at CPU 18 as described earlier. However in this case the CPU checks the amplitude of the signal against a predetermined upper and lower threshold, which is stored in its original operation program signals, i.e. in firmware, shown as ROM 24. If the amplitude is between the upper and lower thresholds, the CPU is caused by a program signal stored in the ROM 24 to check the maximum amplitude to adjacent trough ratio. If desired, the next adjacent peak to preceding trough ratio can also be determined as a further insurance factor. If the ratio is within a predetermined range, (the range signal also being stored in ROM 24), the CPU is caused to store the digitized signal in RAM 23.

It is preferred that the sequence that the CPU should follow is to display on display 21 the commands for introduction of the tag toward receiving antenna 3 in three degrees of intensity or adjacency or threshold ranges. The first, or minimum degree would be introduced first, i.e. having low initial maximum and minimum thresholds between which the signature signal should be detected, checked for ratio range and stored. The threshold range should then be increased in successive trials, and resulting digital signature signals stored in RAM 23 in a similar manner as before.

Each time a successful tag signature signal has been stored in RAM 23, the display 21 should provide an instruction to the operator to proceed and introduce a tag further into the magnetic field, the display 21 providing an indication as to when a successful signature signal storage has occurred.

Signals from the keyboard 22 can then place the CPU into its operational mode. During operation when a tag is introduced adjacent to receive antenna 3, the detected amplitude of the tag signature signal should be classified by degree, within threshold ranges, and the appropriate corresponding tag signature signal having the next highest threshold should be used to compare against it. Indeed, it will be noted that since the repetition rate of the transmit signal antenna is relatively high, there will be a repetitive reception of the tag signature signal for comparison with the stored signature signal by CPU 18 as a person carrying the tag passes through the detection zone. However since the person is continually moving and likely turning the tag as it move past the antenna, the tag may be continuously moving relative to the receive antenna, and the form of the signature signal will usually vary in amplitude with time.

Consequently it is preferred that at least three correlations with the signal stored in RAM 23 should be made within a period of e.g. ¼ second in order that the CPU should generate an alarm enabling signal. However any predetermined number of successive positive correlations could be utilized.

Indeed it is preferred that a correlation technique should be used. For example the CPU preferably operates the transfer functions $$R_K = \sum_{i=0}^{30} t_i S_{itk} \quad (1)$$

$$R_T = \sum_{i=0}^{30} t^2_i \quad (2)$$

where
  $t_i$ is the received tag signature signal,
  S is the stored tag signature signal,
  i is the summation index,
  K is a correlation parameter relating to a signal sample number (e.g. 0 . . . 10)
and in which an output alarm enabling signal is generated in the event the correlation ratio $R_K/R_T$ is equal to or greater than a predetermined value.

In one successful prototype, the ratio $R_K/R_T$ was 0.75, which is expected to be a typical approximate correlation value to indicate a successful correlation.

Indeed, it is contemplated that in addition to display 21, a speech synthesizer could be used, operated by CPU 18 which voices a warning to a person passing through the detection zone, who has generated an alarm enabling signal, e.g. "Please return to the check-out counter since the goods you are carrying have not been adequately checked out".

Figure 6:
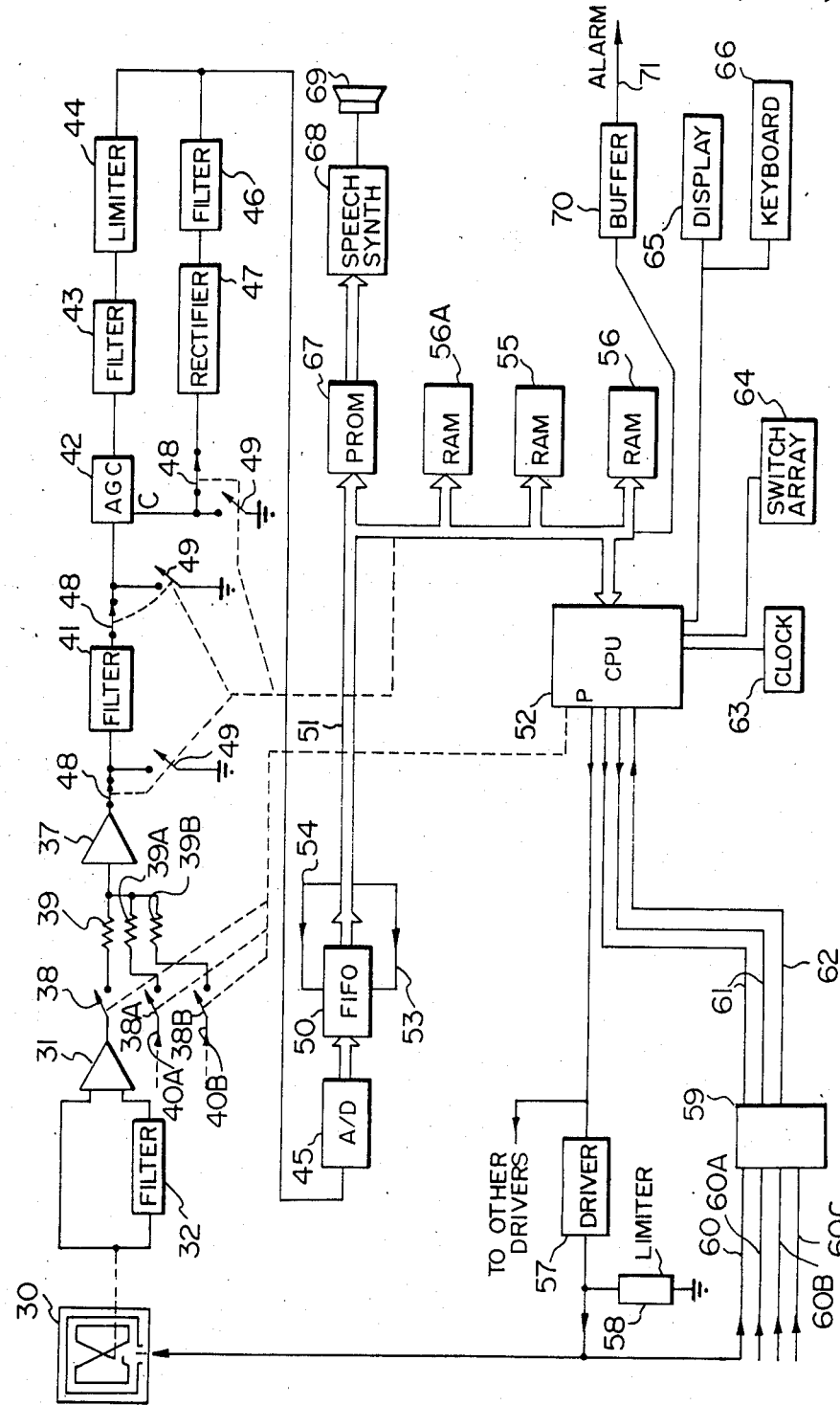
FIG. 6 is a detailed block diagram of the invention.

Turning now to FIG. 6, a detailed block schematic of the preferred embodiment of the invention is shown. As described with reference to FIG. 5, it is preferred that there should be a plurality of transmit antennae and a plurality of receive antennae which can be selected in transmit-receive antennae pairs. However other configurations can be utilized. In FIG. 6 a transmit-receive antennae pair 30 is shown which, for example, can be similar to the antennae described in the aforenoted French Picard patent No. 763,681.

The receiving antenna of the pair is connected to a circuit which removes the low 6.1 KHz frequency carrier signal. The signal is coupled directly to one input of an adder 31, and to another input of the adder through a low pass, low or no phase shift, filter 32. Preferably the filter has a cut-off frequency of about 12 KHz and has no or very low phase shift at about 6.1 KHz. Preferably the adder has gain, and thus the circuit can be considered as an amplifier.

The resulting output signal from the adder is the tag signal, as shown in FIG. 7B. In FIG. 7A, a representative carrier signal at about 6.1 KHz is transmitted in the form of waveform 33 by the transmit antenna, creating an oscillating inductive field as described earlier. A received waveform 34 as shown in FIG. 7B will be found to have distortions 35 at the timing positions at which the tag in the field saturates. These were described earlier with reference to FIG. 3, which shows distortions 12 in waveform 11. These distortions form signature signals 36, shown in FIG. 7C, which will be found at the output of adder 31 (along with any very low amplitude residual carrier).

With the received waveform 34 being applied to adder 31 and to low pass filter 32, the carrier signal and accompanying noise within the passband of the filter are cancelled, and the resulting output signal from the adder is of the form of signature signal 36 shown in FIG. 7C.

It is also preferred that the carrier should be eliminated in this manner rather than by common high pass filtering, since the presently described carrier elimination technique has been found to cause minimum changes to the signature signals. It has been found that an active high pass filter in many cases is non-linear, and it thus changes the characteristics of the signature signal.

Although not shown in this block schematic, it is preferred that the output signal of adder 31 should be buffered.

The output tag signature signal from adder 31 is applied to another adder 37 through switch 38 and input resistor 39. Signature signals of other receiving antennae pass via transmission paths 40A and 40B through switches 38A and 38B, and input resistors 39A and 39B to the input of adder 37. The closure of any of the switches 38, 38A or 38B thus provides an input signal to adder 37. If desired, some antenna configurations make the combinations of the received signals desirable, which can be added together at the input of adder 37.

The selected signature signal of the form of signal 36 (FIG. 7C) or 14 (FIG. 4) is then passed through a high pass filter 41, in order to further reduce any carrier signal, and is then applied to the input of an automatic gain control circuit 42. The resulting output signal is passed through high pass filter 43, is limited in limiter 44, and is applied to the input of analog-to-digital converter 45. The output of limiter 44 is also applied to the input of a bandpass filter 46, which in a successful prototype had a center frequency of 100 KHz, and the resulting output signal is passed through a high speed rectifier 47, the output signal of which is in the form of the envelope of the signature signal. This envelope signal is applied back to the control input C of the automatic gain control circuit 42, preferably through a buffer (not shown). As a result, the automatic gain control responds to the tag signature signals, and not to the amplitude of the carrier signal.

Switches 48 are connected in series between the output of adder 37 and the input of filter 41, the output of filter 41 and the input of automatic gain control 42, and the output of rectifier 47 and the control input of automatic gain control 42. Switches 49 are respectively connected in shunt between the inputs of filter 41, automatic gain control 42 and the control input of automatic gain control 42, and ground. When switches 48 are open, switches 49 are closed, and vice versa. This function both breaks the series circuit so that received signals do not pass through filter 41 and AGC 42, and at the same time connects the signal and control inputs of filter 41 and AGC 42 to ground. This operation is utilized during the time that the transmitting antenna is pumped with the pulse signal 9 which establishes an increasing magnetic field. When the "pumping" is stopped, and the transmitted signal is allowed to decay as described with reference to FIG. 2, switches 48 are closed and switches 49 are opened in order to allow the circuit to operate as described above to pass the signature signals.

The tag signature signals are converted from analog to digital form in analog to digital converter 45. The resulting digital parallel words are passed into FIFO (first in-first out) register 50. The output signal of FIFO 50 is applied to a CPU bus 51, which is a conventional bus communicating with central processing unit 52. A data store enable control line 53 and a reset signal control line 54 from the bus, operated by the CPU enables the FIFO register to read data from the analog to digital converter 45 and to reset the FIFO register when its stored data is applied to the bus and is read by the CPU.

A ROM memory 55 which preferably stores the operation program for the CPU for carrying out the steps described herein in firmware, is connected to bus 51, as is a random access memory RAM 56 which is used in a conventional way as a scratch pad memory. Another random access memory RAM 56A is also connected to bus 51, which stores the learned signature signals against which the signature signals received during normal operation are compared.

The output ports P are connected to individual driver circuits 57 (only one being shown for the sake of clarity). The output of each of the drivers 57 is connected to a transmitting antenna of receive-transmit antennae 30. The output of a driver could be connected to the center tap of a transmit antenna coil, the other terminals of which are selected at appropriate times by the CPU enabling other drivers or switches connected thereto. A transmitting antenna can thereby be coupled to a predetermined receiving antenna selected by the closure of one of the switches 38, 38A, 38B, etc.

In this manner a transmitting antenna carries current from the driver 57, and sets up an oscillating magnetic field in a region through which patrons of a store or a person or article carrying a tag to be sensed pass, which magnetic field is received in a receiving antenna which field has been distorted by a tag which may be in the field, resulting in the signature signal as described earlier. Pairs or groups of transmitting antennae can be energized at the same time to establish the field direction within the magnetic field detection region.

A limiter 58 is connected between the output of each driver and ground, in order to reduce or eliminate transients.

The output signal from each of the drivers 57 is applied to individual inputs of a multiplexer 59, the input lines of which are shown as 60, 60A, 60B and 60C. The individual input lines to multiplexer 59 are selected via address lines 61 connected to central processing unit 52, the signal from the input lines being passed via data line 62 to the CPU. Upon addressing any of the input lines 60-60C, the CPU detects zero crossover of the signal across the transmit antennae, and thereby obtains an indication of the exact timing of the signal passing through the transmitting antenna.

Using the crossover signals the CPU can control the timing of switches 48 and 49, and switches 38, 38A and 38B, the timing of the pump signal enable signal applied to drivers 57 in order to generate the pumping signals (pulses 9 of FIG. 2), to ensure that no signals are processed through filter 41, AGC 42, an analog to digital converter 45 and FIFO 50 during the magnetic field increasing interval corresponding to the pumping interval, and to detect the tag signature signals described above which are applied to bus 51 through FIFO 50.

A clock 63 is connected to CPU 52 in a well known manner. A switch array 64 is also connected to CPU 52 in a well known manner; the selection of any of the switches of the array 64 selects the particular program stored in ROM 55 to operate CPU 52, thus establishing the mode of operation of the entire circuit.

A display 65 and keyboard 66 are also connected to CPU 52 in a normal manner. Keyboard 66 is used to input various parameters such as time of day, operator numbers, etc. which are stored in RAM 66. Display 65 is used to display the information input on keyboard 66, as well as to provide a day and date to the operator and to indicate instructions stored in ROM 55 to the operator, for example steps the operator should take to proceed with the sequence by which the circuit learns and stores the tag signature signal upon installation.

At power up, during installation initialization, it is preferred that the firmware stored in ROM 55 should cause the CPU to output a signal to display 65 which states "Small Signal". At the same time the CPU establishes a magnetic field as described earlier. The operator puts an uncancelled tag in the field, the signature signal then being read by the apparatus. The value of the amplitude should be shown on display 65, and the operator inserts the tag deeper into the magnetic field. The value on the display 65 increases. When the value is between first low level minimum and maximum thresholds, the CPU causes storage of the characteristic shape of the signature signal received from FIFO 50 in digital form in RAM 56.

The CPU then causes the words "Medium Signal" to show on the display 65. The operator puts the tag still deeper into the magnetic field, and the same sequence proceeds as before, but the minimum and maximum thresholds are greater. When the amplitude of the signature signal is between the second thresholds, the characteristic shape of the signature signal is stored in RAM 56.

The CPU causes the display 65 then to display "Large Signal" on display 65. The minimum and maximum thresholds are increased again, and the same procedure is repeated.

Once the large signal has been stored in RAM 56, the CPU places an instruction on display 65 requesting that the operator should enter the date, time and access code number. Preferably there should be more than one access code to ensure security. These access codes are stored in RAM 56, which will be the only access codes which allow operator access to the system.

The operator then presses a "enter" key on keyboard 66, the time and date are displayed on display 65, and the system is operational.

A read only memory 67 is connected to bus 51, and stores data to operate a speech synthesizer circuit 68, which operates a loudspeaker 69. Upon detection of a tag passing through the magnetic field as described earlier, the central processing unit 52 causes an alarm indication signal to be applied to bus 51, enabling PROM 67 to output signals to speech synthesizer 68, resulting in a voiced warning to be synthesized and broadcast via speaker 69 to the person carrying the uncancelled tag. At the same time an alarm signal can be applied via bus 51 and buffer 70 to an alarm line 71 leading to the manager of the store or another person in authority.

It should be noted that more than one memory 67 (or different plug in memories) can be used if it is desired to facilitate the outputting of speech in various languages. One memory 67 could thus be utilized for English, another for French, a third for German, another for Spanish, another for Italian, etc.

It should also be noted that bus 51 can be extended to an expansion module (not shown) which can be connected to a central controller which retains displays, keyboards and control lines for a number of circuits of the kind just described.

It has been found that the invention described above is highly immune from false alarms, and is believed to be a significant advance in the art. Since the system itself learns the signal characteristics of the tag signature signal to be detected, it is adaptable to a great variety of environments, and can be easily reinitialized or recalibrated by unskilled personnel. Since a number of different signature signals can be learned (stored) and true comparison indications given to the operator, the invention is not limited to the detection of theft of merchandise, but can be used for other purposes such as detection of different classes of merchandise carrying tags defined by different saturation characteristics (signatures) of different tags. Personnel carrying tags having different signatures, such as doctors or nurses, can be tracked passing through various detection gates located at strategic locations, such as in hospitals. Since the invention incorporates a central processing unit, manipulations can be made on the numerical value of the number of detections, such as summing the number of goods within various classifications detected passing along a conveyor belt, etc.

A person understanding this invention may now conceive of various embodiments or alternative designs using the principles described herein. All are considered to be within the scope of the invention as defined in the claims appended hereto.

We claim:

1. In a security tag detection system, means for detecting a security tag comprising:
   (a) means for storing a first security tag signature signal,
   (b) means for receiving an operational signature signal established by the presence of a security tag,
   (c) means for comparing the received signature signal with stored signature signal, and
   (d) means for providing an output alarm signal indicative of the presence of the tag in the event the stored signature signal is similar to the compared received signature signal to a predetermined degree, and
   (e) means for repetitively comparing successively received signature signals from said tag and for providing said alarm enabling signal in the event the stored signature signal is similar to the received signature signal to a predetermined degree a predetermined minimum successive number of times.

2. Means for detecting a security tag as defined in claim 1 including means for storing a plurality of different amplitdues of received signature signals from a security tag, and in which the means for comparing is comprised of means for determining an amplitude range of the received signature signal for selecting the closest amplitude range signature signal thereto from the plurality of stored signature signals, and for comparing the received signature signal therewith to determine similarity therewith.

3. Means for detecting a security tag as defined in claim 1 in which the comparing means is comprised of a correlator, and means for generating an output alarm enabling signal in accordance with the transfer functions $$R_K = \sum_{i=0}^{30} t_i S_{itk} \quad (1)$$

$$R_T = \sum_{i=0}^{30} t^2_i \quad (2)$$

where
   $t_i$ is the received tag signature signal,
   S is the stored tag signature signal,
   i is the summation index,
   K is a correlation parameter relating to a signal sample number (e.g. 0 ... 10) and in which an output alarm enabling signal is generated in the event the correlation ratio $RK/R_t$ is equal to or greater than a predetermined value.

4. Means for detecting a security tag as defined in claim 1 further including means for storing the first signature signal in digital form and means for converting the received signature signal to digital form prior to comparison with the stored signature signal.

5. Means for detecting a security tag as defined in claim 1 further including means for storing the first signature signal in digital form, means for converting the received signature signal to digital form prior to comparison with the stored signature signal, in which the comparing means is comprised of a correlator, and means for generating an output alarm enabling signal in accordance with the transfer functions $$R_K = \sum_{i=0}^{30} t_i S_{itk} \quad (1)$$

$$R_T = \sum_{i=0}^{30} t^2_i \quad (2)$$

where
   $t_i$ is the received tag signature signal,
   S is the stored tag signature signal,
   i is the summation index,
   K is a correlation parameter relating to a signal sample number (e.g. 0 ... 10)
and in which an output alarm enabling signal is generated in the event the correlation ratio $RK/R_t$ is is equal to or greater than a predetermined value.

6. In a security detecting system, means for detecting a security tag comprising:
   (a) means for storing a first security tag signature signal,
   (b) means for receiving an operational signature signal established by the presence of a security tag,
   (c) means for comparing the received signature signal with the stored signature signal, and
   (d) means for providing an output alarm signal indicative of the presence of the tag in the event the stored signature signal is similar to the compared received signature to a predetermined degree, including means for repetitively comparing successive received signature signals from said tag and for providing said outpt alarm signal in the event the stored signature signal is similar to the received signature to a predetermined degree a predetermined minimum number of times within a predetermined interval of time.

7. Means for detecting a security tag as defined in claim 6, further including means for storing the first signature signal in digital form, means for converting the received signature signal to digital form prior to comparison with the stored signature signal, in which the comparing means is comprised of a correlator, and means for generating an output alarm enabling signal in accordance with the transfer functions $$R_K = \sum_{i=0}^{30} t_i S_{itk} \quad (1)$$

$$R_T = \sum_{i=0}^{30} t^2_i \quad (2)$$

where
   $t_i$ is the received tag signature signal,
   S is the stored tag signature signal,
   i is the summation index,
   K is a correlation parameter relating to a signal sample number (e.g. 0 ... 10)
and in which an output alarm enabling signal is generated in the event the correlation ratio $RK/R_t$ is is equal to or greater than a predetermined value.

8. In a security tag detection system, means for detecting a security tag comprising:
   (a) means for storing a first security tag signature signal,
   (b) means for receiving an operational signal established by the presence of a security tag, (c) means for comparing the received signature signal with the stored signature signal, (d) means for providing an output alarm signal indicative of the presence of the tag in the event the stored signature signal is similar to the compared received signature signal to a predetermined degree, and in which the means for storing is comprised of (i) means for generating an oscillating magnetic field in a detection region, (ii) means for sensing said magnetic field and for forming a security tag signature signal from distortions in said field caused by said tag in the detection region, (iii) memory means and means for storing the signature signal in the memory means, in which the signature signal is comprised of at least two peaks and a trough therebetween, and in which the means for storing further includes means for storing the signature signal in the event a peak to trough amplitude ratio is at least a predetermined value and also that the peaks are no greater in amplitude than a first threshold and the trough is no samller than a second threshold.

9. In a security tag detection system, means for detecting a security tag comprising:

(a) means for storing a first security tag signature signal, (b) means for receiving an operational signal established by the presence of a security tag, (c) means for comparing the received signature signal with the stored signature signal, (d) means for providing an output alarm signal indicative of the presence of the tag in the event the stored signature signal is similar to the compared received signature signal to a predetermined degree, and in which the means for storing is comprised of (i) means for generating an oscillating magnetic field in a detection region, (ii) means for sensing said magnetic field and for forming a security tag signature signal from distortions in said field caused by said tag in the detection region, (iii) memory means and means for storing the signature signal in the memory means, and in which the signature signal is comprised at least two peaks and a trough therebetween, and in which the means for storing further includes means for determining the aplitude of said peaks and for classifying the amplitude of said peaks, for reading the ratio or ratios of said peaks to said trough in the event the amplitude of said peaks is not in excess of or lower than predetermined thresholds, and for storing a digital representation of said signature in memory locations according to said classifications.

10. In a security tag detection system, means for detecting a security tag comprising:

(a) means for storing a first security tag signature signal, (b) means for receiving an operational signal established by the presence of a security tag, (c) means for comparing the received signature signal with the stored signature signal, (d) means for providing an output alarm signal indicative of the presence of the tag in the event the stored signature signal is similar to the compared received signature signal to a predetermined degree, and in which the means for storing is comprised of (i) means for generating an oscillating magnetic field in a detection region, (ii) means for sensing said magnetic field and for forming a security tag signature signal from distortions in said field caused by said tag in the detection region, (iii) memory means and means for storing the signature signal in the memory means, and in which the signature signal is comprised of at least two peaks and a trough between, and in which the means for sotring further includes means establishing a maximum threshold and assigning an amplitude classification to said threshold, for determining the amplitude of said peaks upon the peaks having amplitudes below said threshold, for reading the ratio or ratios of said peaks to said trough in the event the amplitude of said peaks is not less than a predetermined minimum threshold, and for storing a digital representation of said signature signal in memory locations according to said classification.

11. In a security tag detection system, means for detecting a security tag comprising:

(a) means for storing a first security tag signature signal, (b) means for receiving an operational signal established by the presence of a security tag, (c) means for comparing the received signature signal with the stored signature signal, (d) means for providing an output alarm signal indicative of the presence of the tag in the event the stored signature signal is similar to the compared received signature signal to a predetermined degree, and in which the means for storing is comprised of (i) means for generating an oscillating magnetic field in a detection region, (ii) means for sensing said magnetic field and for forming a security tag signature signal from distortions in said field caused by said tag in the detection region, (iii) memory means and means for storing the signature signal in the memory means, and in which the detecting means is comprised of an adder, means for applying the received signal to one input of an adder, and to the other input of the adder through a filter having a passband sufficient to pass a signal having a frequency of the oscillating magnetic field, whereby signals of said latter frequency are cancelled in the adder, resulting in an enhanced tag signature signal output therefrom.

12. Means for detecting a security tag as defined in claim 11, in which the memory means is a digital memory, further including an analog to digital converter for transforming the enhanced tag signal into digital form, and register means for temporarily storing the transformed tag signal prior to storage in the memory means.

13. Means for detecting a security tag as defined in claim 12, in which the means for storing is comprised of a digital processor, and further including a voice synthesizer means operated under control of the processor for generating a synthesized voiced warning and applying it to a speaker upon provision of said output alarm signal, for acoustical broadcasting to a user carrying said security tag.

14. Means for detecting a security tag as defined in claim 13, in which the voice synthesizer is comprised of means for generating a voiced warning in more than one language.

15. Means for detecting a security tag as defined in claim 1, 8 or 14, including means for storing a plurality of different security tag signature signals, means for comparing the received signature signals with the stored signature signals, and means for providing different output signals indicative of the detection of different ones of the received signature signals.

16. Means for detecting a security tag as defined in claim 1, 8 or 14, in which the alarm signal is an enabling signal for a detection indicating device.

17. Means for detecting a security tag as defined in claim 1, 8 or 14, in which the means for providing the alarm signal is comprised of a digital processor, the processor being adapted to store a count of the numbers of detected tags causing generation of said signal.

18. Means for detecting a security tag as defined in claim 1, 8 or 14, including means for storing a plurality of different security tag signature signals, a digital processor means for comparing the received signature signals with the stored signature signals, the processor being adapted to store a count of the numbers of detected tags of each one of the plurality of different security tag signature signals.

19. In a security tag detection system, means for detecting a security tag comprising:
 (a) means for storing a first security tag signature signal,
 (b) means for receiving an operational signal established by the presence of a security tag,
 (c) means for comparing the received signature signal with the stored signature signal,
 (d) means for providing an output alarm signal indicative of the presence of the tag in the event the stored signature signal is similar to the compared received signature signal to a predetermined degree,
and in which the means for storing is comprised of (i) means for generating an oscillating magnetic field in a detection region,
 (ii) means for sensing said magnetic field and for forming a security tag signature signal from distortions in said field caused by said tag in the detection region,
 (iii) memory means and means for storing the signature signal in the memory means, and in which the means for providing the alarm signal is comprised of a processor, the processor being adapted to enable cyclic and sequential operation of pairs of said generating means and means for receiving a signal from the detection region.

20. Means for detecting a security tag as defined in claim 19, including means for repeatedly causing progressive increase of the oscillating magnetic field over first time periods, and for receiving the signal from the detection region over second time periods immediately following the first time periods.

21. Means for detecting a security tag as defined in claim 20 in which the detecting means is comprised of an adder, means for applying the received signal to one input of an adder, and to the other input of the adder through a filter having a passband sufficient to pass a signal having a frequency of the oscillating magnetic field, whereby signals of said latter frequency are cancelled in the adder, resulting in an enhanced tag signature signal output therefrom.

22. Means for detecting a security tag as defined in claim 20, including means for storing a plurality of different security tag signature signals, means for comparing the received signature signals with the stored signature signals, and means for providing different output signals indicative of the detection of different ones of the received signature signals.

23. Means for detecting a security tag as defined in claim 20, 21, or 22, in which the means for providing the alarm signal is comprised of a digital processor, the processor being adapted to store a count of the numbers of detected tags causing generation of said signal.

* * * * *